United States Patent [19]

Webster et al.

[11] Patent Number: 5,285,718
[45] Date of Patent: Feb. 15, 1994

[54] COMBINATION BEVERAGE BREWER WITH COLD WATER SUPPLY

[75] Inventors: Joseph P. Webster; William L. Gustafson; Larry G. English, all of St. Charles, Mo.

[73] Assignee: Newco Enterprises, Incorporated, St. Charles, Mo.

[21] Appl. No.: 915,053

[22] Filed: Jul. 16, 1992

[51] Int. Cl.$^5$ .................................. A47J 31/50
[52] U.S. Cl. ...................... 99/290; 99/279; 99/283; 99/304; 99/316
[58] Field of Search ............. 99/283, 290, 294, 299, 99/316, 304, 305, 291, 279; 62/394, 138

[56] References Cited

U.S. PATENT DOCUMENTS

| | | | |
|---|---|---|---|
| 2,414,669 | 1/1947 | Reich | 99/291 |
| 2,641,992 | 6/1953 | Clemens | 99/305 |
| 2,682,984 | 7/1954 | Melikian et al. | 99/283 |
| 2,712,887 | 7/1955 | King | 99/283 |
| 3,223,023 | 12/1965 | Miller | 99/283 |
| 4,008,832 | 2/1977 | Rodth | 62/138 |
| 4,484,515 | 11/1984 | Illy | 99/285 |
| 4,649,809 | 3/1987 | Kanezashi | 99/290 |
| 4,858,523 | 8/1989 | Helbing | 99/285 |
| 4,919,041 | 4/1990 | Miller | 99/279 |
| 5,063,836 | 11/1991 | Patel | 99/299 |

Primary Examiner—Harvey C. Hornsby
Assistant Examiner—James F. Hook
Attorney, Agent, or Firm—Paul M. Denk

[57] ABSTRACT

A combination beverage brewer with cold water supply is embodied within a housing, to furnish a beverage brewing segment, at one or more locations within a housing, and a water chilling or cooling supply disposed in association therewith, to supply cold water as required. The beverage brewer incorporates a hot water tank, a heating element therein, which hot water is delivered to a spray head for deposit onto a basket of grounds for brewing of a beverage. In addition, hot water may be tapped from the tank and delivered to a faucet for direct dispensing. The cold water segment of the apparatus includes a cold water tank, a cooling rod therein, cooling module for operating as a heat pump for extracting warmth from the water to heat it, and delivery of the extracted heat to a heat sink, for dissipation. Various electronic and electrical controls are provided for regulating the operations of the various components of the device, and a filtering device is included for filtering the incoming water, and is coupled with various indicators for instructing when filter service is required, or the capacity of the apparatus has reached the processing of a maximum quantity of water.

8 Claims, 4 Drawing Sheets

COMBINATION BEVERAGE BREWER WITH COLD WATER SUPPLY

BACKGROUND OF THE INVENTION

This invention relates generally to the provision of a combination brewer, for use for brewing of coffee, tea, or the like, and applied in association with a liquid cooling means, and more specifically an integral section of the combination dispenser that can chill or make cold water for use for dispensing for other purposes.

There are a large number of beverage brewers, particularly of the coffee type, that have long been available upon the market. In fact, select of the applicants herein have a number of patents that provide means for brewing of beverages, such as disclosed in U.S. Pat. No. 4,829,888. Examples of some of the earlier coffee making machines are shown in other United States patents, such as that to Bunn, U.S. Pat. No. RE. 25,663. Other earlier patents include those to the same inventor, primarily for use for coffee brewing, as can be seen in the U.S. Pat. No. 3,034,417, No. 3,100,434, No. 3,793,935, No. 3,610,132, No. 3,593,650, No. 3,608,471, No. 3,450,024, No. 3,691,932, No. 3,385,201, No. 3,336,856, No. 3,220,334, No. 3,149,556, No. 2,551,219, No. 2,561,134, No. 3,425,337, No. 3,425,338, No. 3,369,477, and No. 3,959,502. Other earlier patents to the same or other inventors upon related developments, that are for use for brewing beverages, can be seen in the U.S. Pat. No. 3,771,432, No. 3,793,934, No. 3,736,155, No. 3,691,933, No. 3,608,471, No. 3,593,650, No. 3,385,201, No. 3,336,856, No. 3,220,334, No. 3,425,337, No. 3,369,477, and No. 3,425,338. Most of the foregoing patents show early types of embodiments for coffee brewing devices wherein hot water overflows, or cold water is poured into the brewer for heating, and then either through overflowing, or siphoning off for spraying onto a filter containing a quantity of grounds or crystals for making primarily a coffee, for immediate dispensing into a beaker decanter or other service vessel.

Various types of design patents upon this form of technology include the U.S. Pat. No. Des. 274,029, No. Des. 229,897, No. Des. 239,756, No. Des. 239,757, No. Des. 241,219, No. Des. 269,325, and No. Des. 280,377.

Other more recent United States patents showing beverage making machines, and which incorporate structure for use for brewing a beverage such as coffee, can be seen in the U.S. Pat. No. 4,478,139, which describes a separate cold water basin that delivers its water to a water tank wherein the water is heated to a hot consistency. Other such United States patents are shown in U.S. Pat. No. 3,218,955, No. 3,319,561, No. 4,054,085, No. 4,621,571, and No. 4,603,620.

Additional patents disclosing brewing means contained within a housing include U.S. Pat. No. 3,494,276, No. 4,413,552, No. 4,464,981, No. 4,476,775, No. 4,478,139, No. 4,503,757, No. 3,736,155, No. 3,691,933, No. 3,793,935, and No. 4,531,046. While some of the shown embodiments utilize cold water in their functioning, it is the pouring in or delivery of the cold water to their systems, and more specifically into their hot water tanks, wherein the cold water is heated for delivery to a brewing basket, is the extent of usage of any available cold water accommodated by their structures.

It is to be noted, though, that in applicants' earlier U.S. Pat. No. 4,829,888, that either tap water or heated water may be dispensed, auxiliary, from an independent faucet that mounts upon the housing of the embodiment shown in said patent. On the other hand, the cooling or chilling of that particular water is just not disclosed or considered in the description of the embodiment shown in this earlier patent.

This invention relates principally to a combination type of brewer, wherein, initially, a beverage may be brewed within the structure of its housing, generally a beverage in the category of coffee, tea, or the like, while simultaneously, an independent supply of water or other liquid may be chilled, by refrigeration means, and selectively dispensed by means of a cold water tap, or the like.

The essence of this invention is to provide a combination coffee brewer, and water cooler, in which the basic housing includes a filter monitoring center, which communicates information relating to the filtering of any fluids entering into the housing, as well as the volume of liquid used, so as to alert the operator to the preprogrammed amount of volume the filter is rated for and its need to be changed within certain specified times, or after complete capacity of usage.

The beverage brewer and liquid cooler of this device incorporates a component formed housing, with the housing being segregated into a pair of sections, divided by a center wall, at least one of the sections provided for functioning as the beverage brewing side, such as a coffee brewer, and which performs in the general manner of operation as previously described in our U.S. Pat. No. 4,829,888, for brewing a beverage such as coffee from related components. The other section of this particular formed housing provides the cooling side of the equipment, and it has been designed utilizing thermoelectric cooling means to produce the cold water for direct dispensing for consumption and drinking. Thus, the combination of both heating and cooling within the same appliance as identified herein, and disclosed in this particular embodiment, all of which is attained from simultaneous functioning in the same cabinetry, from the direct supply of a low capacity electrical charge.

Generally, the cooling system of this particular housing incorporates or is embodied within the usual cabinet, comprising outer metal sides, forming the housing, and is generally filled with an insulating foam that surrounds the stainless steel tank where the vacuum breaker, the water inlet, a cooling module, and cooling rod are located. The cooling rod, as installed within the separate cold water tank is preferably constructed of a high density aluminum, Teflon coated, and is of a capacity that will supply an abundance of quickly chilled water for dispensing, as required.

The beverage brewing segment of this dispenser also includes a hot water tank, for receiving water for heating, and further includes various heating element(s) for quickly heating any water supplied therein, in preparation for its delivery and for use for drip brewing of a beverage, such as coffee.

In its usage, once the brewer is connected into the water line, and turned on, the water will fill up the cooling tank assembly to the level of a water level probe. The thermoelectric process begins once the machine is plugged in electrically. The thermal cooling process module is kept on at all times, but is controlled by a system of probes located in the tank to turn it from the low power to high power so as to accelerate the cooling rates, as well as control the ice bank that is built up within the device. Once the water reaches the signal probe, and the ice probe, the thermoelectric cooling process is turned to full power, and the thermal cooling module will start to function as a heat pump.

The basic principle of operation of this device is that the electric current put through the cooling module starts a heat pumping effect on one side of the module, in this case on its top side, and transfers that heat up to the heat sink. A fan may be constructed into the top of the unit to blow air down on top of the heat sink to dissipate the developed heat. As the cooling module pumps heat, obviously, the withdrawal of heat produces a cold environment, and thus, the rod of the cooling means becomes extremely cold, and the water is cooled by that rod. Over a period of twelve to fourteen hours, the rod will chill down enough to start to freeze the water on the rod, and thus builds up an ice bank. That ice bank is what is desired, and sought for build up because of its latent energy storage capabilities, and thus the ice bank quickly cools the water in the tank similar to the ice in any glass of beverage. As the ice bank builds up, and eventually covers the ice probe, the ice probe no longer receives a signal from the signal probe, and because ice is not a conductor of electricity, and once that signal is lost, the electronics of this device reduces the power to the cooling module to prevent a total freeze-up.

The cooling module of this assembly, consists of a heat sink, a cooling rod, the lid and all of its probes, with a wattage draw from its fan, for the cooling system, being approximately 75 watts at 125 volts.

As previously alluded to, the tank heating system for hot water, and for brewing a beverage, such as coffee, is similar to other units that incorporate the capillary bulb and heating element assemblies. The device compensates for hot water draw out of the tank reservoir, and allows the user to be able to draw water from the main reservoir during the brew cycle without proportionally reducing the amount of hot water remaining in the decanter in proportion to the hot water drawn out for other purposes.

The principle of the control board used in conjunction with this development is unique in that when a brew cycle is initiated, if water is not making contact with the level probe located in the lid of the hot water tank, the preset time set for brew delay will not begin to count until the water achieves that level of the identified probes. Ar that point, the timer will count to its preset set point. The probe does not control any solenoid valves. It simply controls the counting that takes place in the timer. This solves a significant problem with state of the art equipment that does not have such technology, which if left unused, but on, over a period of time, results in the evaporation of water volume out of the tank. When such evaporation occurs, the first preset volume brew will short the amount of evaporation which usually occurs. By designing the tank system in this manner, the level probe always balances the tank out for a proper starting point, which eliminates the fluctuation of beverage delivered to a decanter, which otherwise occurs as a result of evaporation.

Another unique feature of this current system is that the microswitch which is interfaced with the faucet handle provides further control. During a brew cycle, if one operates the faucet for hot water dispensing, he also activates the microswitch simultaneously. The microswitch stalls the timer ar whatever point it has achieved in its counting, and as long as the faucet is depressed, the timer will continue to operate, but not count. When the user stops dispensing hot water from the faucet, the microswitch will open, and the brew timer will start to continue its preset count, up to its present time frame. What this achieves is that it always delivers hot water to the brewing means in the identical quantity over a fixed period of time, so as to eliminate any fluctuation in the volume of hot water provided, as a result of faucet dispensing.

The device also includes other adjustment features, such as a signalling system that is built into the circuit board, and which provides a warning, such as the indication of a yellow light upon the front plate of the brewer, which initially provides a blinking light when a brew cycle is initiated, in order to alert the operator that a brewing cycle is in process, and one should not remove the decanter or brew basket prematurely from the apparatus. There is provided upon the control board of this device a separate adjustment to callibrate the length of time that the flashing light sustains, to complete a brewing cycle. This is important primarily because the brew cycle, from a filling standpoint and while siphoning, is different from the time it takes for the hot water and the coffee in the brew basket to complete its dripping process, so a separate adjustment such as this is necessary.

The heating and cooling systems, that cooperate with their respective heating and cooling tanks, are generally installed in the rear of the equipment, and divided by a center wall to deflect the heat away from the cooling side, and to simplify the construction and servicing of the apparatus. All the electronics for the filter monitoring system, as well as the power systems for the cooling assembly, are maintained in a component package which is easily removed from the assembly, and generally are maintained at the upper front segement of the housing, forwardly of the cold water tank assembly, so as to be separated from any generated heat.

The filter monitoring systems of this apparatus were developed and designed to allow the user to easily handle, and understand when filtering change may be needed, after sustained operation of this equipment. The electronics are designed around the filter system that is installed upon this equipment. The two criteria of the filter design were to be able to program the volumn capacity of a particular filter, under the controlled flow rate parameters, and to alert the user when the filter has reached its maximum usable capacity. In addition to volume, the system monitors the duration of time the filter has been in operation. As an example, if a filter manufacturer recommends a capacity raring of a thousand gallons or twelve months usage, the electronic system of this apparatus keeps track of both of these parameters, and which ever occurs first, the change filter light of this device lights up. The system has its own battery backup support, in the event of power loss, to maintain the memory for these callibrations, for up to two weeks duration. While utilizing the filter monitoring information light system, one can readily detect when the filtering process is occuring, and that the quality of water delivered will be of good quality, and when the filter needs to be changed the user will be quickly alerted to this requirement.

Another feature of this invention is that one model is equipped with a light emitting diode LED readout display which is designed to communicate the amount of gallons used for water and coffee consumption, and to turn on a "service filter" light ar the preprogrammed determination as to when a filter maximum capacity has been reached. In addition to the gallons displayed, the unit incorporates a declining bar graph to show the percent of filter life remaining, which is correlated to the amount of gallons used by the apparatus. When the bar graph declines from a one hundred percent to a twenty percent level, a green LED lights up, and at the ten percent life remaining level, the bar graph will turn the color orange, and ar the filter change level, the bar graph disappears, and the "filter change" light initiates.

In addition to the foregoing, in one further embodiment of this invention, the water cooling means alone has been developed as a countertop model. The stand-alone cooler uses the same cooling system and display monitors, as previously described. In addition, this modification is equipped with an auxiliary monitoring system so that an independent piece of coffee brewing equipment could be hooked up to the machine by way of its water line, and function as a combination unit, similar to that of this described invention. The filter monitoring system is designed to have the flow rate of the auxiliary piece of equipment programmed into its electronics, and whenever the auxiliary piece of brewing equipment is operated, the filter monitoring system will keep track of the volume of water consumed by that auxiliary piece of equipment, in addition to the water volume consumed by the stand-alone cooling means, to provide an indication of the total amount of water passing through the filtering means.

It is, therefore, the principal object of this invention to provide a combination beverage brewer with cold water supply, embodied in the same piece of equipment, for use for brewing of a beverage, such as coffee, while simultaneously providing a supply of chilled water as needed.

A further object of this invention is to provide various control means used in association with a combination brewer to provide a ready indication of the amount of water used and consumed, and which has passed through its filtration system.

Still another object of this invention is to provide a filtration monitoring device used in conjunction with the filter of a brewer to provide an indication as to the remaining useful life of the incoming supply water filter, and to let the operator know when the filter needs to be replaced Still another object of this invention is to provide an indication as to the remaining useful life of the filter used in conjunction with the combination brewer and cold water supply apparatus of this invention.

Still a further object of this invention is to provide electronic means for controlling the operations of the brewer, so that should hot or other water be dispensed from the brewer, the brewing sequence will be temporarily delayed, so that a complete brewing cycle to the precise time period preset into the apparatus will always occur during the performance of a brewing operation.

Still another object of this invention is to provide a cold water supply means embodied within a piece of equipment and which may be utilized either on the countertop, or for restaurant, commercial, or industrial applications. Yet another object of this invention is to provide a cold water chilling apparatus which may combined with a piece of brewing equipment to attain the supply of a brewed beverage, in addition to cold water.

Still another object of this invention is to utilize thermoelectric cooling means, in the category of a heat pump, to provide chilling of water from a beverage dispenser.

Yet another object of this invention is to provide convenient insulation means used in association with the water cooling apparatus of this invention in order to sustain the cold water developed through the operations of the refrigeration equipment used in conjunction with this combination brewer.

These and other objects may become more apparent to those skilled in the art upon reviewing this summary of the invention, and upon undertaking a study of the description of the preferred embodiment, in view of the drawings.

DESCRIPTION OF THE PREFERRED EMBODIMENT

Figures 1, 2:
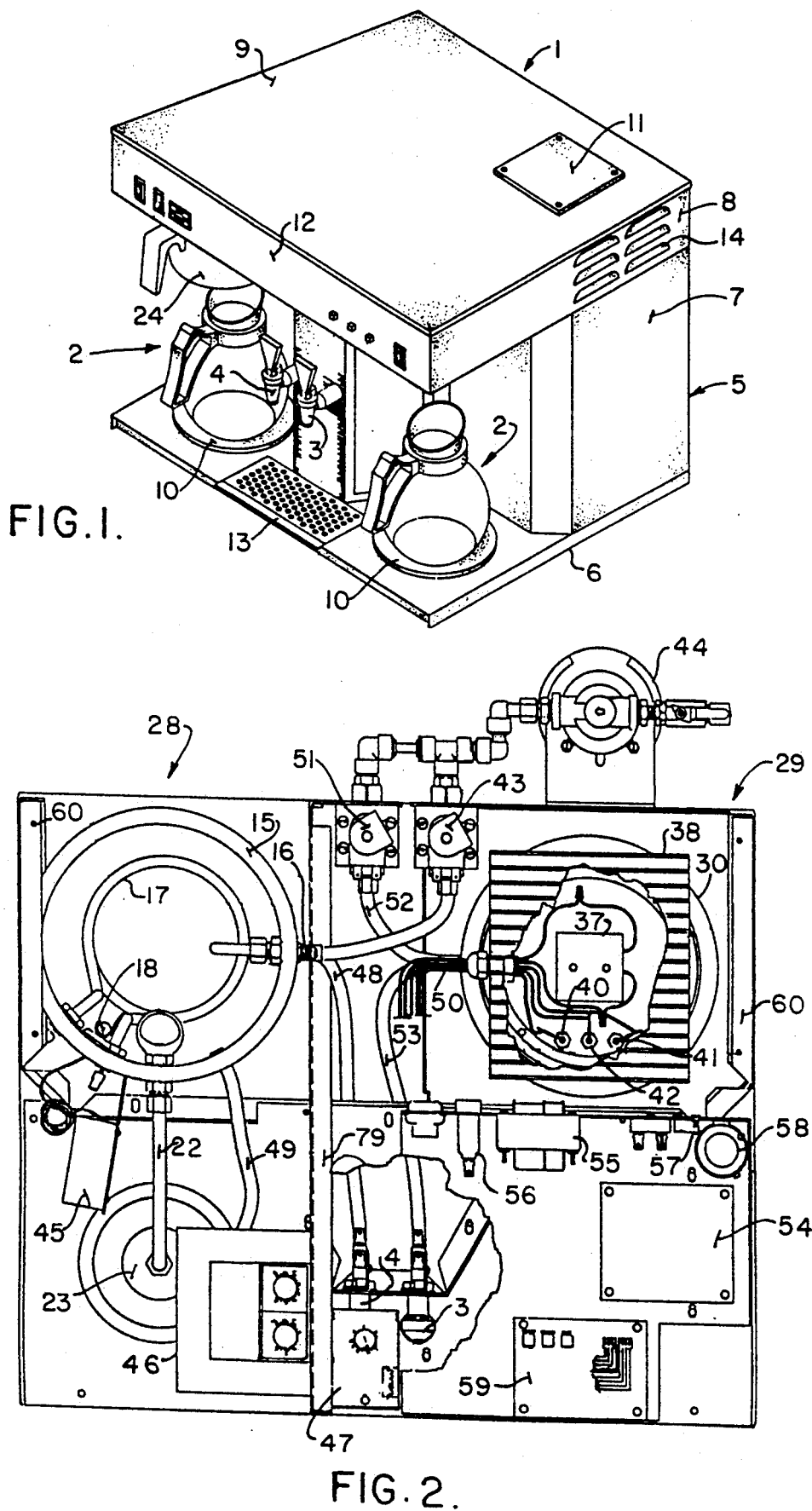
FIG. 1 is an isometric view of the combination beverage brewer with cold water supply of this invention.
FIG. 2 is a plan view, with the top of the device removed, showing the various mechanical and electronic components contained within this combined apparatus.

In referring to the drawings, and in particular FIG. 1, the combination beverage brewer with cold water supply apparatus 1 is disclosed. Obviously, the arrangement of the various brewer assemblies, and the supply of cold water to a dispenser, or even the delivery of hot water from a separate faucet, can be designed in a variety of combinations, as can be readily understood, but in the embodiment as shown, this particular apparatus provides a pair of brewing assemblies, for filling the two decanters 2, while likewise, cold water, after it has been chilled, may be supplied to the faucet 3, while hot water may be delivered through the spigot 4. In any event, the apparatus includes a housing 5, which includes a base 6, sidewalls 7, and a top cantilevered portion 8, that incorporates its top wall 9, as can be seen. The base 6 may include a pair of heating elements or plates, as at 10, for sustaining the warming of any heated beverage that is dispensed into the decanters 2, as readily known in the art. In addition, the top wall 9 may include various access apertures, such as the one covered by the coverplate 11, to attain entrance into the portion 8 for servicing of select electrical or electronic components, or to provide a location for air intake. Or, the entire top wall 9 may be removable, for achieving access to all of the operative components of this apparatus. Furthermore, a front panel 12 contains the various control switches, indicator lights, and other gauging means for providing manual access to the controls for attaining the functional operations of this brewer, or the filtration of the water that is delivered to the apparatus, during its usage. In addition, the base 6 further includes a drain plate 13, which may collect any overflow or excess water dispensed from the faucets 3 and 4, as can be seen. Furthermore, venting to the controls may be obtained through the louvers 14, to provide for any cooling to the operating electronic components, or to vent off any excess heat generated by the heating elements contained within the operative components of this invention.

Figure 3:
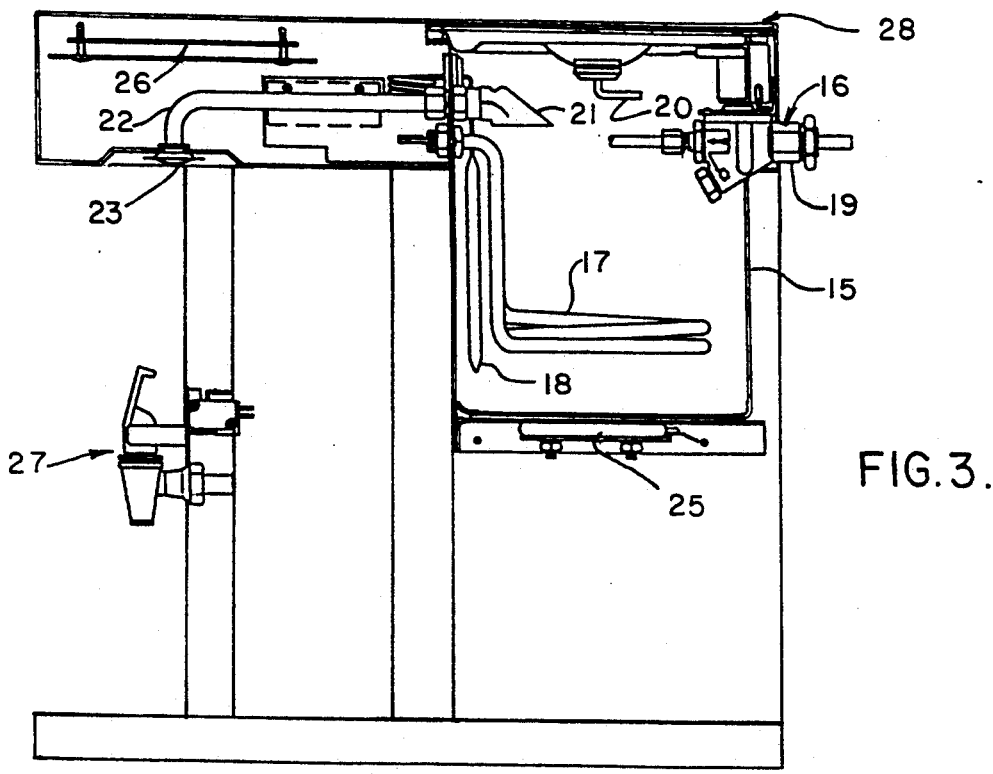
FIG. 3 is a sectional view showing the hot water tank means and brewing means components of this invention.

As can be seen in FIG. 3, the brewer segment of this combination apparatus is disclosed. The embodiment as shown therein is of the type that may be constructed into the combination apparatus, or even of the type as shown in FIG. 1, where a pair of beverage brewing segments are provided. Nevertheless, each brewing segment includes a hot water tank, as at 15, that includes a water inlet means 16, which delivers water into the tank from a cold water supply, wherein it is heated, in preparation for its delivery to the brewing apparatus. As is known in the art, a heating element 17 is provided, for heating, under controlled operations, the water contained within the tank, up to that temperature required to provide brewing of any beverage, such as coffee, or the like. Further contained within the tank is the thermostat capillary bulb 18, which provides for precise registration of the temperature of the water within the tank, at any given moment, and finishes control and regulation of the heating of the water therein, once delivered from the cold water inlet, until that time when the water has been sufficiently heated to the hot temperature required to achieve brewing. Furthermore, the cold water inlet includes various solenoids, as at 19, to provide for the shut-off or opening of the inlet, when supplying water to the tank, in preparation for its heating. In addition, a liquid level probe 20 is provided, that determines when the high water level has been reached, upon delivery of ambient water to the hot water tank 15, and the solenoid must be actuated to shut off the entrance of any further water to said tank. Furthermore, disclosed within the hot water tank is the vacuum breaker 21, for the delivery of heated water to the water tube 22, on its route to the spray head 23, for its discharge into the brew basket, one as shown at 24 in FIG. 1. The construction and function of the delivery of hot water to its spray head, and to a brew basket, such as that as shown at 24, are known in the art.

In order to assure that the hot water generated within the hot water tank, by means of a heater element 17, maintains a consistant temperature, even during prolonged periods of delay between brewing cycles, a warmer element 25 is provided, at the underside of the tank 15, to sustain the warmth of the heated water contained therein. As can also be seen in this figure, the hot side control board 26 is provided, and mounts the various electrical and electronic components that provide the electrical functioning and operations of the brewing segment of this apparatus. Furthermore, a hot water dispenser 27 (corresponding to spigot 4) is provided and mounted upon the front of the apparatus, at a central and convenient location, for dispensing hot water directly from the tank 15, where a quantity of straight hot water may be desired by the user.

As can also be seen in FIG. 2, the brewer side of the combination apparatus is generally disclosed at 28. Furthermore, the cold water supply side of the apparatus is shown generally at 29, in order to provide the supply of chilled water from the apparatus, for the convenience of its user. Obviously, the type of combination apparatus as disclosed in FIG. 1, may incorporate two brewer units, and include another brewer segment, such as that as shown at 28, to the opposite or right hand side of the cold water supply segment 29, although such is not shown within the assembly as displayed in said FIG. 2. Or, the right warmer 10 may be used for warming purposes only.

Figure 4:
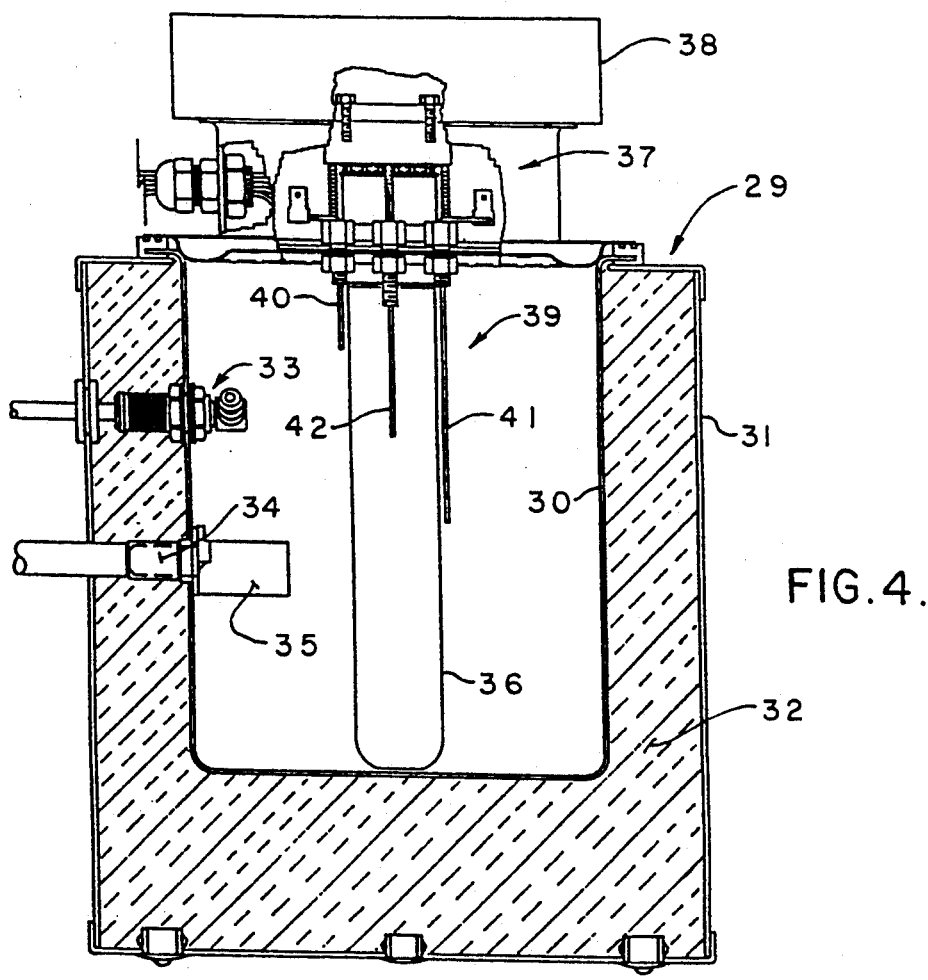
FIG. 4 is a sectional view disclosing the cold water tank and cooling element and components of this apparatus.

The cold water supply 29 is disclosed in FIG. 4. In the embodiment as shown, the cold water tank 30 is housed within a compartment 31, and arranged intermediately thereof is a quantity of insulation, as at 32, which may be formed of a polymer foam, or other form of insulation, as known in the art. A water inlet supply means 33 is provided for delivery of water to the tank 30, and a water outlet is provided at 34, which contains a vacuum breaker 35 to prevent the disruption of the flow of water through the outlet, when the dispenser 3 is opened. Provided within the unit is a cooling rod 36, which is installed within the cold water tank, and is constructed df a high density aluminum and coated with Teflon. The thermal cooling module 37 is provided for absorbing heat out of the water, and delivering to the heat sink 38, for dissipation. The thermal cooling module 37 is kept on at all times, as previously referred to, but is controlled by a system of probes, as at 39, to sustain its proper operation. Initially, a water level probe 40 is provided for detecting when the water level supplied to the stainless steel tank 30 reaches a full capacity, in order to shut off any solenoid valves provided within the inlet 33. A signal in probe 41 detects when the water level within the tank 30 reaches this level, and initiates the thermoelectric cooling process to a turn-on to full power. When this occurs, the thermo cooling module starts its heat pump cycle. An ice probe 42 indicates when the ice on the cooling rod 36 has built up to that level when it insulates the probe, and turns down the power of the cooling module 37, thereby allowing the build up of ice to chill the contained water. As previously explained, when electrical charge is conducted to the cooling module, this starts the heat pumping effect on one side of the module, on its top side, and transfers the heat absorbed from the cooling rod up to the heat sink 38, for its dissipation. As the cooling module pumps the heat, obviously, the removal of heat from the water generates a coldness in its cooling rod, and thus the rod becomes extremely cold, with the water being cooled by the cold rod. When the rod chills down to a sufficient extent, the proximate begins to freeze upon the rod, that builds up an ice bank, and it is this ice bank upon the rod that cools additional water added into the tank. The ice bank builds up and eventually covers the ice probe 42, and when that occurs, said probe will no longer receive a signal from the signal probe 41, since ice is not a conductor of electricity, and once that signal is lost, the electronics reduces the charge to the cooling module to prevent further freeze-up. Miscellaneous components for forming the cooling rod 36 and the cooling module 37, said components being assembled into these means for cooling of the water, may be obtained from Thermoelectric Ind.

Corp., of North Las Vegas, Nev., under Model No. 781402.

FIG. 2, as previously explained, discloses the brewing section 28 and the water chiller 29 of this combination brewing apparatus. As can be seen, the tank 15 includes the inlet 16 for supplying water to the heating tank. The hot tank inlet solenoid is disclosed at 43 which provides for shut-off of flow of water from the filter head assembly 44, which is provided for filtering any mineral or other deleterious deposits from the tap water supplied to this brewer. The tank heating element 17 is disclosed therein, in addition to its thermostat 18. The hot water tube 22 delivers the heated water to the spray head 23, as previously reviewed. The main thermostat control 45 receives the temperature signal from the thermostat 18, for providing for regulation of the degrees of heating conducted to the water delivered to the hot water tank 15. The hot side or brewer side control board 46 contains the various electronic or electrical controls which regulate the temperatures to which the water is heated within the hot water tank 15, by means of its heater 17. In addition, the electronic timer 46, regulates the brew cycle time, for delivery of water to the spray head 23, so that when hot water is tapped from the hot water tank 15, by way of the conduit 48, for dispensing out of its accompanying spigot 4, the timing sequence, as previously summarized, will be delayed during such dispensing, so that a consistent volume for brewing of any coffee or other beverage can be maintained throughout each cycle of operation. An overflow line 49 is provided for discharge of any excess water delivered to the heating tank 15, in the event that it reaches an over fill capacity.

The water cooling segment 29 includes its tank 30, having the cold block/cooling module 37 provided thereon, for furnishing operations to the heat-pump of the cooling means of this apparatus. And, as can be seen, its heat sink 38 is provide thereon, and for receipt of any of the conducted heat extracted by means of the cooling rod 36 from the vessel 30, where said heat sink may be cooled by dissipation of its contained heat by means of its finned heat exchange structure, or perhaps any type of blower means (not shown) may be provided for cooling of the heat sink during its functioning. The various wirings 50 are shown for providing the conduct of charge to the cooling module to provide for its control and operation. As can further be seen, the charge conducted to the various probes, such as the water level probe 40, the ice probe 42, and the signal in probe 41 are likewise disclosed. Water is conducted to the cold water tank from the filter 44, through its associated solenoid control valve 51, and through the conduit 52, for delivery to the tank 30. The water outlet, previously identified at 34, is connected to its flow line 53 for delivery to the faucet 3, as earlier explained.

The various electrical controls for regulating the power supply, and for furnishing charge to the various control means, including solenoid valves, is likewise shown in FIG. 2. This includes the power supply board 54 that mounts various components for regulating the input power, normally, at 110 volts, for conduct of the control charge to the various electrical components. These components include the transformer 55 for reducing the charge conducted to the miscellaneous electronic controls used for providing detection through its various connected probes, in addition to the filter control board, as will be subsequently described. A circuit breaker 56 provides for a disconnection of electrical power, in the event that an irregularity in electrical charge is detected, or other breakdown occurs within the unit. Furthermore, miscellaneous resistors 57 and capacitors 58 are furnished for further electrical control. In addition, the filtering control board 59 provides an indication and readout as to the status of the filter head assembly means, and the extent to which the capacity of the filtering unit has been employed, in addition to the quanity of water that has been delivered and processed through the apparatus, can be readily determined.

Furthermore, as can be seen in FIG. 2, there are various types of metal or other material forms of reinforcement structure, and flange means, such as shown at 60, that are used an employed for holding the various components in place, once assembled, and for connection of the miscellaneous walls to the housing, when constructed, as known in the art.

Figure 5:
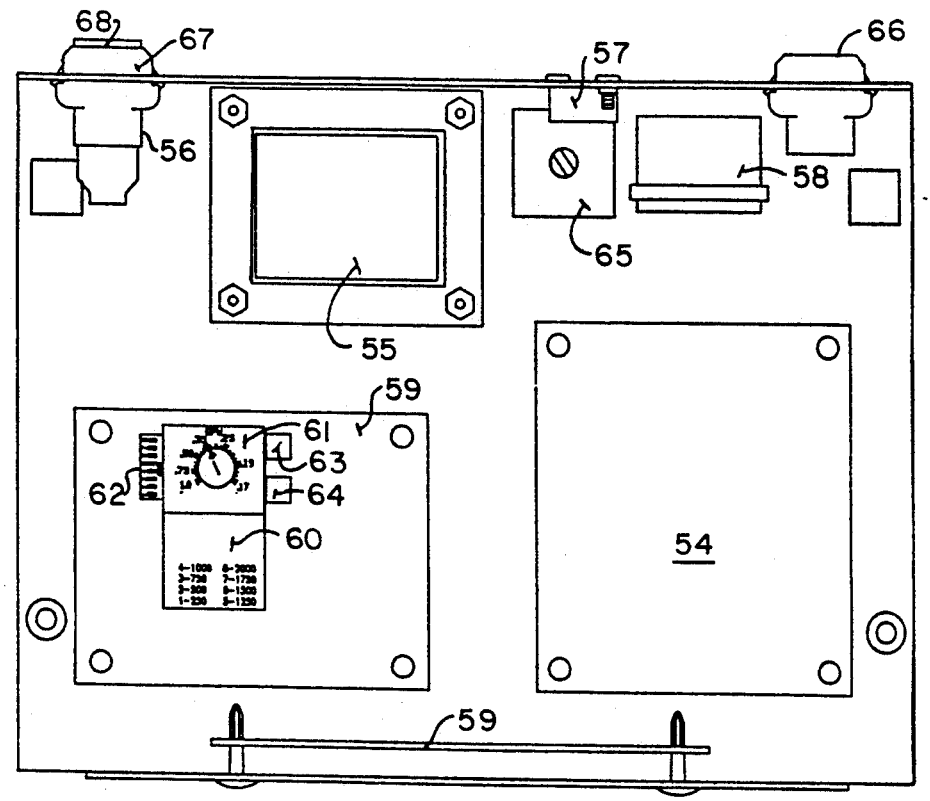
FIG. 5 is a plan view of the component panel assembly and component layout providing the power supply for operations of this apparatus.

The electrical and electronic controls for this particular apparatus are further shown in detail in FIG. 5, and include the filter control board 59, as previously explained. It includes means for detecting and providing a scale indication, as at 60, for determining the amount of gallons of water treated by the filter assembly 44. In addition, the flow rate of water into the various tanks can be preset by the external rate set means 61 for determining the capacity and quantity of water to be delivered to and through the apparatus, for processing, either as hot or cold water. The filter capacity switch 62 provides a means for indicating the filter life remaining before a change over and its service must be conducted. A test switch 63 provides means for resting the electrical characteristics of the apparatus, while a reset switch 64 provides for reinitiation of the device, once it has been tested, or serviced. The power supply board 54, is further disclosed. Furthermore, the transformer 55, is shown, in addition to the circuit breaker 56, the resistor 57, and the bridging unit 65. The capacitor 58 is disclosed, as are the nine pole harness connector 66, and the six pole harness connector 67, to which the various electrical leads may connect. In addition, the circuit breaker reset 68 is provided, for resetting of the electrical connections, in the event that the circuit breaker shorts out the electrical operations of the device, due to some malfunction. Furthermore, the display board 59, containing the filter control electronics, also connects in association with these electrical components, for providing other operations to the combination apparatus.

Figure 6:
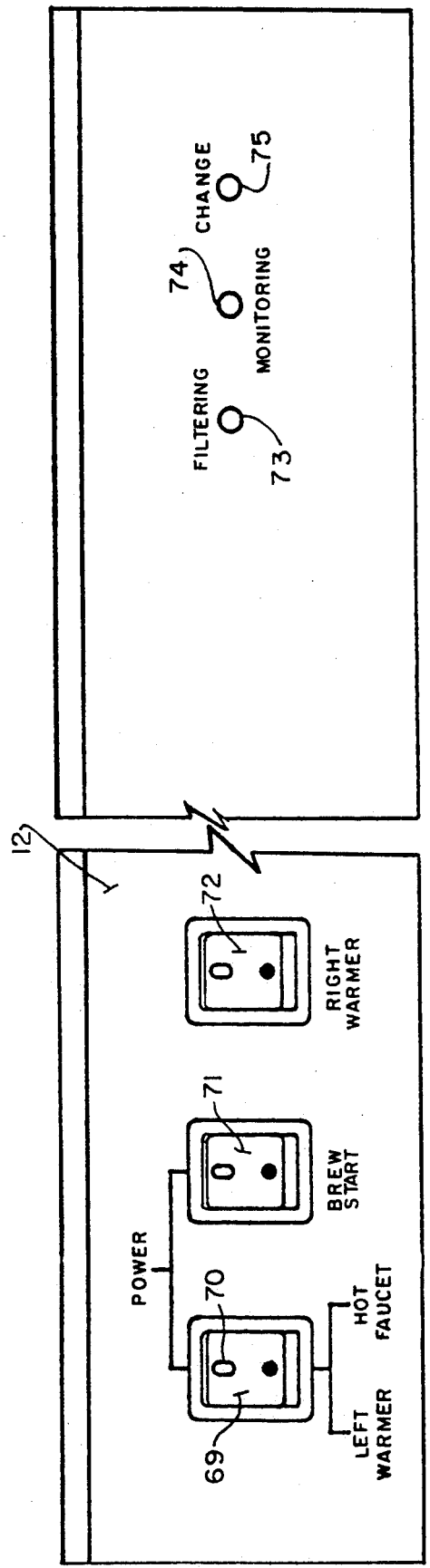
FIG. 6 is a front view of a face panel provided upon the upper front of the apparatus, disclosing the various control switches, indicator lights, and information pertaining to water filtration.

As can be seen in FIG. 6, the controls for operating the various warmers, initiating a brew cycle, and for otherwise providing electrical connection to various operating components to initiate their cycle of operations, are provided upon the front plate 12 of this apparatus. For example, electrical power is conducted through the variety of switch means provided upon the control panel, and which include the conduct of charge to the various heating elements, through initiation of the switch 69, for maintaining the charged element within the left side warming plate 10, as can be seen in FIG. 1, in addition to maintaining the warmth of the water at the hot water faucet 4, as previously explained. Furthemore, each of these switches may contain an indicator light, such as at 70, which will be maintained lighted, when the switch has been turned on. A brew start cycle switch 71 is provided for initiating the flow of water through the water tube 22, to the spray head 23, in a manner that is well known in the art. Usually this occurs by delivering additional water to the tank, which causes the hot water to be initially forced out through the vacuum breaker 21, and to the spray head 23, for discharge onto the grounds contained within the brew basket 24, as previously reviewed, and as is well known in the art. Also, the right warmer 10 ignition switch 72 is also furnished upon the front panel. In addition, various light indicators are provided, as at 73 through 75, for indicating when filtering is occuring, when a monitoring of the filtering system is being detected, and when a filter change or servicing is required, as through the ignition of the light 75.

Figure 7:
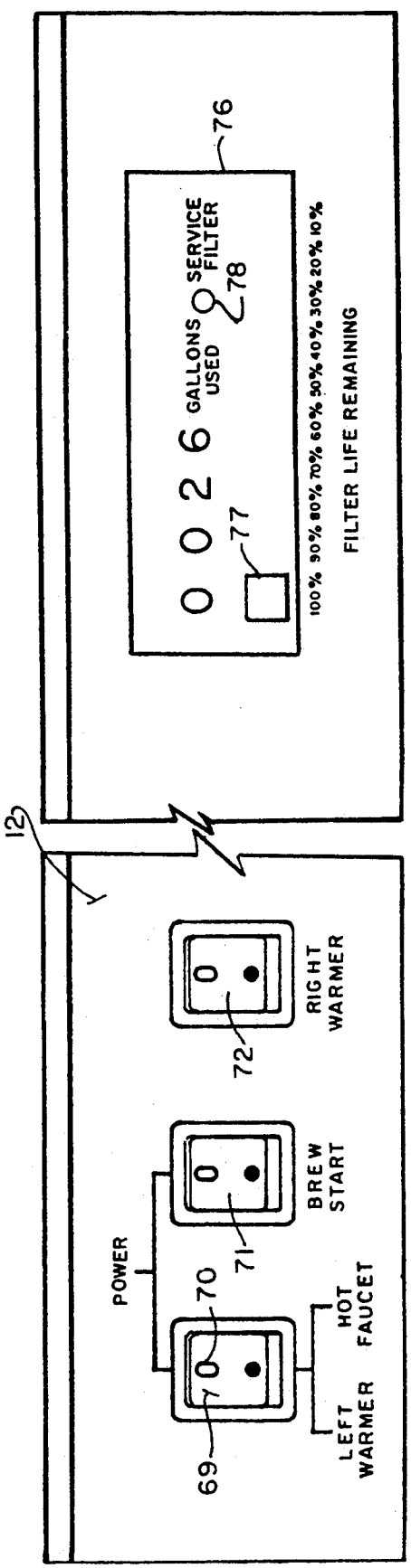
FIG. 7 is a view of a modified front panel disclosing the control switches and indicator lights, in addition to the bar graph disclosing filter life remaining, in addition to the amount of gallons water processed by the apparatus.

FIG. 7 shows similar type components provided upon the front panel, such as the switches 69 through 72, in the manner as previously explained. But for this particular face panel, the filter functioning characteristics are disclosed at 76, and provide more detailed information regarding the operations of the filter component 44, such as the amount of gallons of water passing through the filter, as can be seen, an indication of the percent of filter life remaining through the display of a bar graph, as at 77, and an indication light 78 that is lighted when the filter needs to be serviced, due to either the filter life remaining achieving an approximate zero percent, or when, for example, a thousand gallons of water have passed through the filter, for delivery to the cold water chiller, or the hot water brewer.

Other structural features embodied in this particular device, and referring once again to FIG. 2, is the provision of a center wall 79, and which may even contain some insulation, in order to deflect the heat from the brewing segment 28, away from the cooling section 29, and to simplify the construction and servicing of this apparatus.

Figure 8:
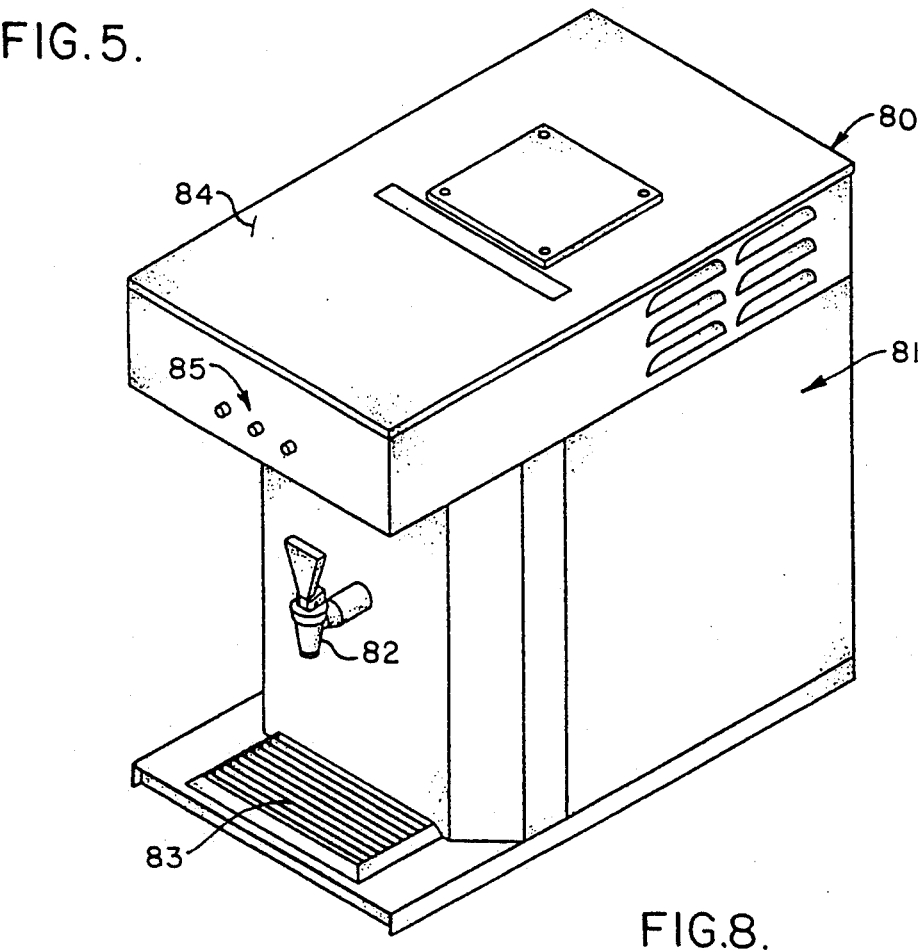
FIG. 8 is an isometric view of a modification to the apparatus disclosing a discrete water cooler of the countertop model of this invention.

As can be further seen in FIG. 8, and as previously briefly alluded to, the apparatus may be fabricated containing just the cooling component 29 of this invention. In this embodiment, the internal components of the unit 80, and which are embodied within its housing 81, include the cold water tank 30, as previously explained, and its cooling rod 36. A cold water faucet 82, similar to that as previously described at 3, is provided for delivery of the cold water for dispensing, and the base component includes a drain 83 for reception and drain off of any excess water. In order to be consistent of structure, the housing 80 includes a cantilevered section 84, the front of which may contain the various operating controls and electronics as previously explained in FIG. 5, but particularly only those relating to the regulation of the cooling means or cooling module, such as that as previously described at 37. In addition, various indicator lamps 85 may be provided upon the front panel, for indicating filtering, monitoring, and when a filter service or change is necessary, as previously explained in FIG. 6. This unit may be marketed as a countertop model, independently, for delivery of cold water where required, or it may be equipped with an auxiliary monitoring system so that an independent piece of coffee brewing equipment can be electrically and mechanically hooked up to it, and used in association therewith, yet operating from the same filter monitoring system, to provide a assembled combination beverage brewer with a cold water supply means.

The filter assembly 44, useful for cleansing of the water being delivered to this combination brewer, is made up a variety of components, which can be obtained from Everpure, Inc., of Chicago, Ill. In this particular embodiment, the rate of flow of water through the filter, and particular of its components, can be used in combination with the time of flow to determine the quantity of water that passes through the filter, during the filtration process. Then, these calculations are processd by the electronics of this device, such as mounted upon the filtering control board 59, to provide a calculation of the quantity of water processed by the filter means, and the remaining filter life left before it must be serviced. To the contrary, it is just as likely that other means could be used for calculating such determinations, such as a tranducessor may be exposed to the waterflow, at said location, for generation of a signal for use for processing of data that may provide related calculations, and determinations of the quantity of water flowing through the filter, and the filter life remaining.

Variations or modifications to the subject matter of this invention may occur to those skilled in the art upon reviewing the disclosure as made herein. Such variations, if within the spirit of this invention, are intended to be encompassed within the scope of any claims to patent protection issuing upon this development. The description of the preferred embodiment set forth herein is done so for illustrative purposes only.

Having thus described the invention, what is claimed and desired to be secured by Letters Patent is:

1. A combined dispenser of the type incorporating both a beverage brewer and a liquid cooler for receiving liquid from a supply source, and formed having a component housing, said housing segregated into two sections, the first section provided for containment of those components for brewing a beverage such as coffee and the like, and the other section provided for containing those components for cooling of a liquid for delivery by the dispenser, the liquids received by the first and other sections from a supply source being independently processed, with both the processed hot and cold distinct liquids received from the supply source being delivered by the dispenser upon functioning, the first section further containing a hot water tank means, for receiving water from the supply source for heating, a heating element contained within the tank means for heating said contained water, a brewing means operatively associated with the brewing section for receiving the heated water and for brewing a beverage, the other section containing a cold water tank means for receiving water from the supply source for cooling, cooling rod means provided within the cold water tank means for cooling said contained water, and dispenser means operatively associated with the cooling section for dispensing of cold water, insulation means provided within the housing within the cooling section and surrounding a part of the cold water tank means to insulate it from any generated ambient heat, and a wall contained within the housing and separating the brewing section from the cooling section of the combined dispenser, cooling module means operatively associated with the rod means and functioning upon operation as a heat pump to draw heat from the contained water to attain its cooling, heat exchanger means connecting with the cooling module means to provide for dissipation of heat extracted by the cooling rod means from the contained water, a water level probe operatively associated with the cooling rod means within the cold water tank and provided for detecting the level of water delivered to the cold water tank means during functioning of the dispenser when operated for cooling of a liquid, a filter and filter monitoring means associated with the combined dispenser, said filter provided for filtering of the incoming water and the filter monitoring means operatively associated with the filter and determining the quantity of water processed by the various sections, electronic means operatively associated with the filter monitoring means for determining the quantity of water passing through the said filter, said electronic means incorporating electronic counting means for gauging the length of a brewing cycle, whereby precisely controlled and regulated processing of liquid from a supply source is independently treated to produce both hot and cold distinct liquids within the first and other sections respectively of the combined dispenser to furnish a brewed beverage and an independent supply of cold water during its functioning.

2. The invention of claim 1 and including various probe means operatively associated with the cooling rod means and provided for determining the extent of build up of ice upon the cooling rod means during chilling of the contained water.

3. The invention of claim 1 and including transducer means operatively associated with the filter monitoring means for producing a signal from which the volumn of liquid passing through the filter means can be determined.

4. The invention of claim 1 wherein said electronic means operatively associated with the brewing means, and for providing a precise determination of the length of time established for a brewing cycle, during functioning of the beverage brewer.

5. The invention of claim 4 and wherein said electronic means including electronic counting means, for determining the length of time for a brewing cycle, and said counting means capable of discontinuing in its count when the brewing cycle is suspended.

6. The invention of claim 1 and further including a faucet means operatively associated with the hot water tank means and capable of independently dispensing hot water from the beverage brewer section of said dispenser.

7. The invention of claim 6 and wherein said electronic means operatively associated with the beverage brewer, said electronic means incorporating counting means for gauging the length of a brewing cycle, and said counting means capable of suspending a count during a brewing cycle when hot water is dispensed from the hot water faucet means.

8. The invention of claim 1 and wherein said cooling module means remains operative at all times during the electrical connection of the combined dispenser.

* * * * *